United States Patent
Frankel et al.

(10) Patent No.: US 9,207,461 B2
(45) Date of Patent: Dec. 8, 2015

(54) FIBER OPTICAL PACKAGE INTERCONNECT

(75) Inventors: Michael Y. Frankel, Baltimore, MD (US); Vladimir S. Grigoryan, Elkridge, MD (US); Ian B. Betty, Ottawa (CA)

(73) Assignee: Ciena Corporation, Hanover, MD (US)

( * ) Notice: Subject to any disclaimer, the term of this patent is extended or adjusted under 35 U.S.C. 154(b) by 409 days.

(21) Appl. No.: 13/300,294

(22) Filed: Nov. 18, 2011

(65) Prior Publication Data

US 2013/0128330 A1     May 23, 2013

(51) Int. Cl.
  *G02B 6/00*   (2006.01)
  *G02B 27/28*  (2006.01)

(52) U.S. Cl.
  CPC .................................. *G02B 27/286* (2013.01)

(58) Field of Classification Search
  None
  See application file for complete search history.

(56) References Cited

U.S. PATENT DOCUMENTS

| | | | | |
|---|---|---|---|---|
| 5,850,375 A | * | 12/1998 | Wilde et al. | 369/14 |
| 6,492,800 B1 | * | 12/2002 | Woods et al. | 324/96 |
| 6,535,657 B2 | * | 3/2003 | Dyott | 385/11 |
| 6,574,015 B1 | * | 6/2003 | Tselikov et al. | 398/36 |
| 6,891,622 B2 | * | 5/2005 | Dyott | 356/483 |
| 7,158,705 B2 | * | 1/2007 | Berkey et al. | 385/123 |
| 7,251,258 B2 | * | 7/2007 | Wise et al. | 372/6 |
| 7,298,945 B2 | | 11/2007 | Gunn, III et al. | |
| 7,692,420 B2 | * | 4/2010 | Bohnert et al. | 324/96 |
| 2002/0029865 A1 | * | 3/2002 | Kneppe et al. | 164/453 |
| 2003/0021514 A1 | * | 1/2003 | Ito et al. | 385/11 |
| 2011/0243498 A1 | * | 10/2011 | Viswanathan et al. | 385/28 |

OTHER PUBLICATIONS

Polarization-Maintaining Optical Fiber. Wikipedia: http://en.wikipedia.org/wiki/Polarization-maintaining_optical_fiber. This page was last modified on Sep. 18, 2011 at 05:11.
EE 230: Optical Fiber Communication Lecture 10. Light Sources and Transmitters: www.soe.ucsc.edu/classes/ee230/Winter06/Lecture%2010.ppt. From the Movie: Warriors of the Net. Slide 13: Source Fiber Coupling—II.
Zaman, T.R. et al., "Proposal for a Polarization-Independent Integrated Optical Circulator." IEEE Photonics Technology Letters, vol. 18, No. 12, Jun. 15, 2006. pp. 1359-1361.
Fan, M. et al., "High Directivity, Vertical Fiber-to-Chip Coupler with Anisotropically Radiating Grating Teeth." Research Laboratory of Electronics, Massachusetts Institute of Technology, 77 Massachusetts Ave, Cambridge, Massachusetts 02139. CTuDD3.pdf.
Katigbak, A. et al., "Compact silicon slot waveguide polarization splitter." OE Letters. Optical Engineering, Aug. 2009/vol. 48(8). 080503-1-3. Downloaded from SPIE Digital Library on Jan. 13, 2011.
Spun Fiber: Low-birefringence fiber for circularly polarized light. http://www.ivgfiber.com/spun_fiber.htm.
Tower Optical Corporation: http://www.toweroptical.com/wdm-optics.cfm.

* cited by examiner

*Primary Examiner* — Tina Wong
(74) *Attorney, Agent, or Firm* — Clements Bernard PLLC; Christopher L. Bernard; Lawrence A. Baratta, Jr.

(57) ABSTRACT

Optical devices and systems including a polarization maintaining interconnect are disclosed. An optical assembly can include an optical component, a low-birefringence optical fiber and a polarization transformer. The polarization transformer is coupled between the optical component and the optical fiber. The polarization transformer is configured to transform between a substantially circularly-polarized light at the low-birefringence optical fiber and a substantially linearly-polarized light at the optical component.

14 Claims, 5 Drawing Sheets

FIBER OPTICAL PACKAGE INTERCONNECT

FIELD OF DISCLOSURE

The present disclosure pertains to the area of optical packaging. In particular, the disclosed embodiments relate to optical systems that require a polarization maintaining interconnect.

BACKGROUND

Optical fibers are used in fiber-optic communications to permit high bandwidth transmission of information over longer distances. The optical fiber is a cylindrical dielectric waveguide that transmits light along its axis, by the process of total internal reflection. As shown in FIG. 1, polarization maintaining optical fiber conventionally includes a transparent core 105 surrounded by a transparent cladding layer 104, which has a lower index of refraction compared to the transparent core 105 and also stress rods 106 or other stress inducing elements. FIG. 1 further illustrates the cross-sectional views of various optical fibers, such as the Panda fiber 101, the elliptical-clad fiber 102, and the bow-tie fiber 103.

Due to some of these unique characteristics of optical fibers, joining lengths of optical fiber using an interconnect is more complex than joining electrical wire or cable. Optical fibers may be connected to each other by connectors or by splicing. Splicing occurs when two fibers are joined together to form a continuous optical waveguide. Alternatively, an optical fiber connector terminates the end of an optical fiber, and enables quicker connection and disconnection than splicing. The connectors mechanically couple and align the cores of fibers so that light can pass from one core to the next.

Optical signals traveling in optical fiber frequently are coupled to optoelectronic circuits. There are a variety of known techniques and devices for coupling optical fibers to optoelectronic circuits. Once an optical signal is coupled to an optoelectronic circuit, the signal can be processed either as an optical signal or converted to an electronic signal for further processing.

The flat end of an optical fiber can be directly connected to the edge of an integrated circuit. Consequently, an optical signal can be coupled to a flat end of an integrated waveguide, but the fiber and the waveguide can have different cross sectional geometries and can be different in size.

FIG. 2 illustrates an example of an arrangement of coupling a fiber to a source (e.g., a laser). A feed fiber (optical fiber 206) is inserted inside a metallic jacket or lensed capsule 202, through a metal wall or source alignment module 203 of the package 200. The feed fiber 206 can be adjusted along the Cartesian axis in three dimensions, to enable the core of the fiber to axially align to the waveguide of the source 204 in order to correctly capture the light 205 from the source 204.

Embodiments of the invention disclose an optical package interconnect that maintains polarization regardless of orientation and optical fiber length. Therefore, the interconnect does not require manual adjustment when connecting fiber optic systems.

SUMMARY

The described features generally relate to optical systems that require a polarization maintaining interconnect.

An embodiment of the invention can include an optical assembly comprising: an optical component; a low-birefringence optical fiber; and a polarization transformer coupled between the optical component and the optical fiber, wherein the polarization transformer is configured to transform between a substantially circularly-polarized light at the low-birefringence optical fiber and a substantially linearly-polarized light at the optical component.

Another embodiment can include an optical system comprising: a low-birefringence optical fiber; a transmitter side assembly, wherein the transmitter side assembly includes: a connector having a first face and second face, wherein the first face includes at least one receptacle for the low-birefringence optical fiber and the second face includes a receptacle for receiving an optical source; and a first polarization transformer coupled to the connector in between the first face and the second face, and configured to generate from the optical source, a substantially circularly-polarized light for an input of the low-birefringence optical fiber; and a receiver side assembly, wherein the receiver side assembly includes: a housing having a third face and fourth face, wherein the third face includes at least one receptacle for receiving an output from the low-birefringence optical fiber; and a second polarization transformer coupled to the fourth face of the housing wherein the second polarization transformer generates a substantially linearly-polarized light from the output of the low-birefringence optical fiber.

Another embodiment can include apparatus comprising: means for generating an optical signal; means for transforming the optical signal to a circularly-polarized light; and means for propagating the circularly-polarized light while maintaining the circularly-polarized light.

Further scope of the applicability of the described methods and apparatuses will become apparent from the following detailed description, claims, and drawings. The detailed description and specific examples, while indicating specific examples of the disclosure and claims, are given by way of illustration only, since various changes and modifications within the spirit and scope of the description will become apparent to those skilled in the art.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
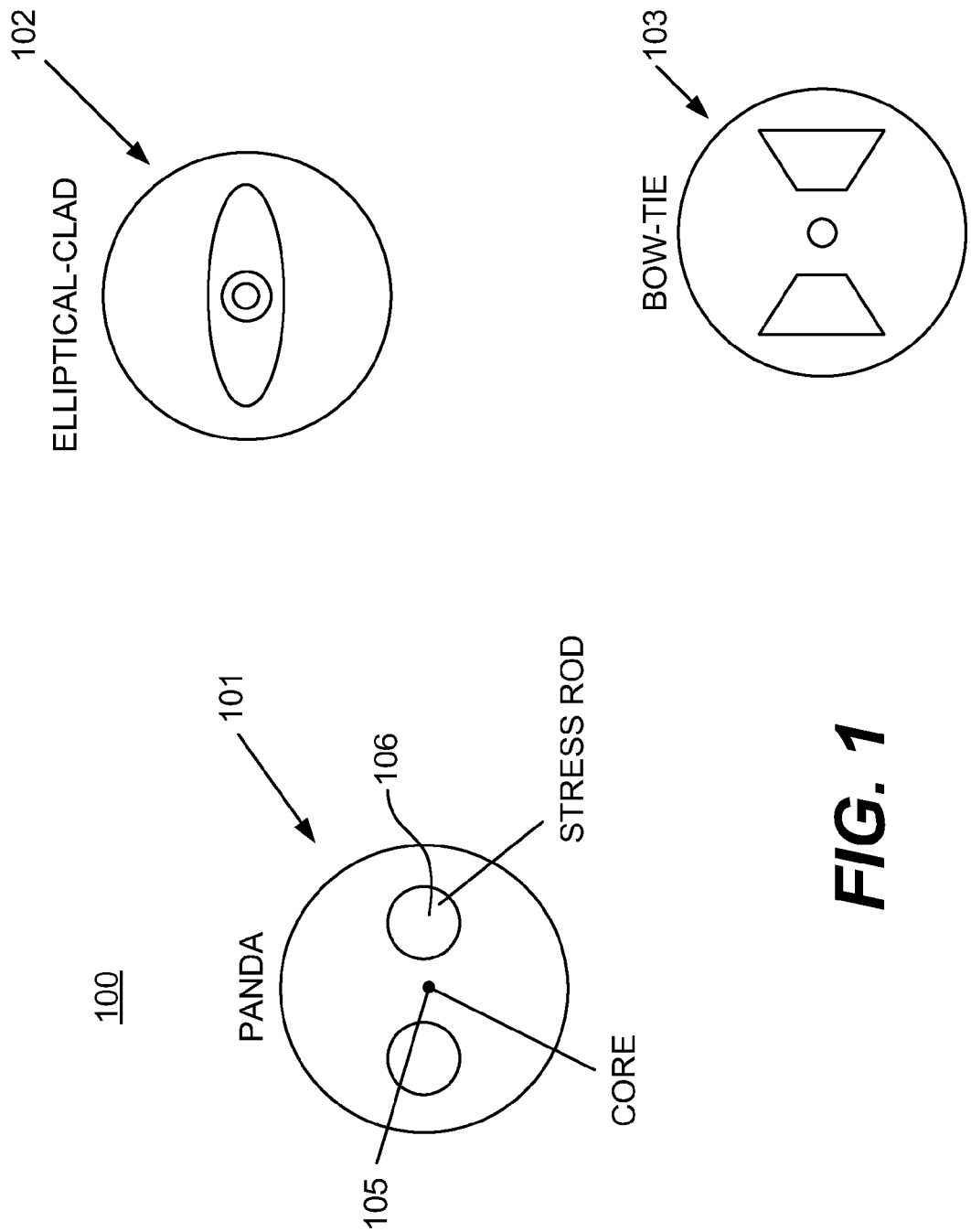
FIG. 1 is a cylindrical cross-sectional view of polarization maintaining optical fibers.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The various embodiments include an interconnect, which does not require manual adjustment when connecting polarization-dependent fiber optic systems. As a result, the various embodiments can provide a path to highly integrated, low power, low cost optoelectronic module designs. Current fiber optic platforms are particularly constrained on size and power consumption, and the embodiments can be used for implementing high levels of optical integration and packaging.

The various embodiments disclose an optical package interconnect that maintains polarization. In the area of optical packaging, many of the optical parts are still packaged separately. Some optical systems require a polarization maintaining interconnect, typically between lasers and subsequent polarization sensitive components, such as waveguides and modulators. These interconnector parts require polarization control. The various embodiments disclosed herein can facilitate the connection of multiple optical fibers while maintaining the state of optical polarization.

Referring back to FIG. 1, various conventional linear polarization maintaining fibers are illustrated in cross-sectional views. As can be appreciated from the cross-section of the Panda fiber 101, the elliptical-clad fiber 102, and the bow-tie fiber 103, conventional fibers break the cylindrical symmetry around the core axis by introducing mechanical stress members into the fiber. A conventional polarization-maintaining fiber may only maintain the state polarization for linearly polarized light, therefore any other polarized light will not maintain its state of polarization (SOP) and the output SOP will be altered depending on the input SOP.

Figure 2:
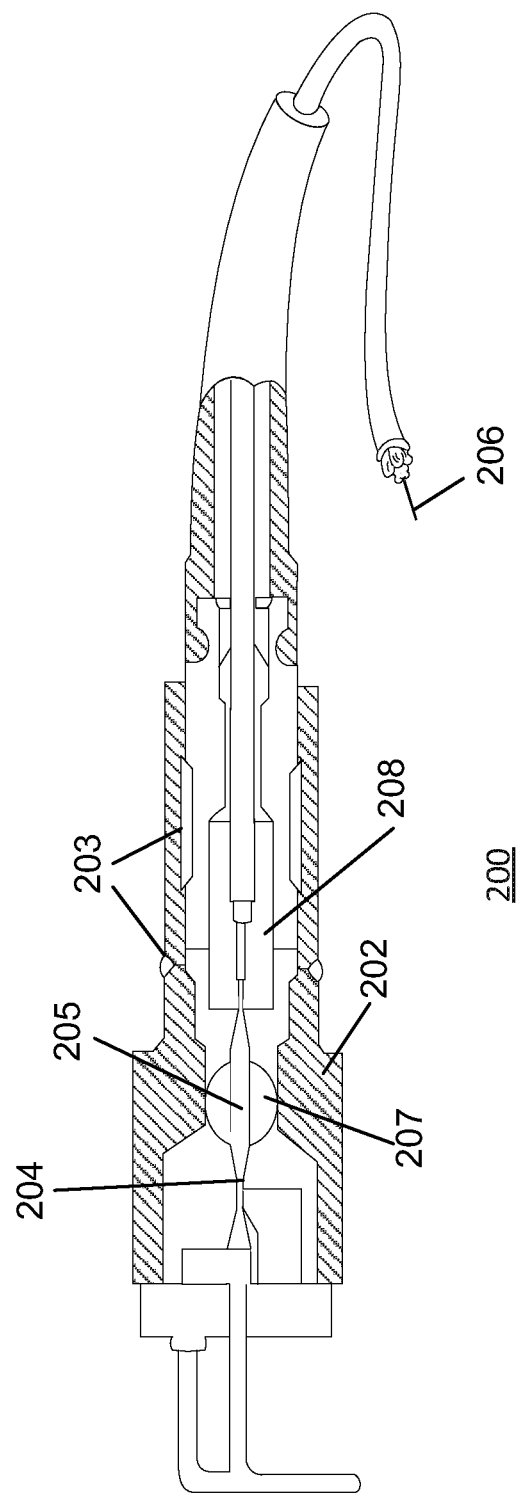
FIG. 2 is a cross-sectional view of a conventional laser to fiber coupling.

FIG. 2 illustrates an example of an arrangement for coupling a fiber to a laser. An optical fiber 206 is inserted inside a metallic jacket or lensed capsule 202, through a metal wall or laser alignment module 203 of the package 200. The optical fiber 206 can be adjusted along the x,y,z axis, to enable the core of the fiber to axially aligned to the waveguide of the laser 204 in order to correctly capture the light 205 from the laser 204. With a conventional polarization maintaining fiber, the fiber needs to be rotated around its core axis in order to align the fiber stress-inducing members with the polarization of the light. Aligning the fibers can become burdensome when there is an array of fibers that need to be connected, aligned and axially rotated simultaneously, as this greatly increases the complexity of the alignment of the fibers. The laser 204, which can be encompassed inside a lensed capsule 202, provides linear light that is coupled to optical fiber 206. The light from the laser 204 passes through a lens 207 to a glass capillary 208 before it is transmitted on the optical fiber 206. The glass capillary 208 is inside the lensed capsule 202, but can be aligned via the laser alignment module 203. Then, the optical fiber 206 can couple to a different package, which then couples to a modulator (not pictured). Modulators have polarization sensitivity; therefore modulators have to be specifically aligned with the fiber in the correct working optical axis.

Conventional methods can work reasonably well if only one source (e.g., laser) is interconnected to one polarization-sensitive component (e.g., a modulator). However, in the continued development of optical technology, many components are being interconnected in an array. Using conventional methods and devices, it is difficult and time-consuming to simultaneously align all the components with the correct polarization axis. For example, a first fiber, which is coupled on either side to a source and a second fiber, is rotated to be aligned in the correct axis with reference to the source, but as a result the second fiber, now needs to be rotated in order to be aligned in the correct axis with reference to the first fiber. This example of alignment must be continued if other fibers or components are coupled to the second fiber. Therefore, simultaneously aligning an array of fibers in the correct axis can be difficult and time-consuming.

Embodiments of the invention replace the conventional linear polarization maintaining fiber with a fiber that has high intrinsic birefringence and high spin structure, called spun fiber, to provide a resulting low effective birefringence fiber (referred to as a low birefringence fiber or spun fiber). A fiber with low or zero birefringence maintains the state of polarization from the input. For example, linear light going into the low or zero birefringence fiber will come out as linear light. Likewise, circularly polarized light going into the zero birefringence fiber will come out as circularly polarized light. In contrast, a conventional fiber would arbitrarily transform light polarization. Spun fiber operates as low effective birefringence fiber with respect to a circularly polarized input light. The circularly polarized light going into the spun fiber will come out as circularly polarized light. That is, the spun fiber operates as a polarization maintaining fiber for a circularly polarized light. Whereas, a linearly polarized light going into the spun fiber will exit the spun fiber as a slightly elliptically polarized light with the major axis rotated relative to the input polarization vector by a fixed but unpredicted angle. The inverse aspect ratio of the output elliptically polarized light is a small quantity on the order of a ratio of the spin period over the beat length of a regular (not spun) fiber with the same local birefringence. Since the low birefringence fiber, or spun fiber, preserves the state of input polarization, the spun fiber does not perturb a circular state of polarization. As a result, the need to rotationally align the fiber to either the laser or modulator can be been eliminated.

When a linearly polarized light is inputted into the spun fiber, the spun fiber outputs a linearly polarized light, but the light might be tilted at an angle. In order to calculate the angle, the fiber needs to be measured or cleaved to a precise length, which may be rather cumbersome to do during the manufacturing. However if a circularly polarized light in inputted into the spun fiber, the spun fiber outputs a circularly polarized light irrespectively of the fiber length. Circularly polarized light by definition has no predefined orientation axis, and is rotationally invariant around the core axis.

Figure 3:
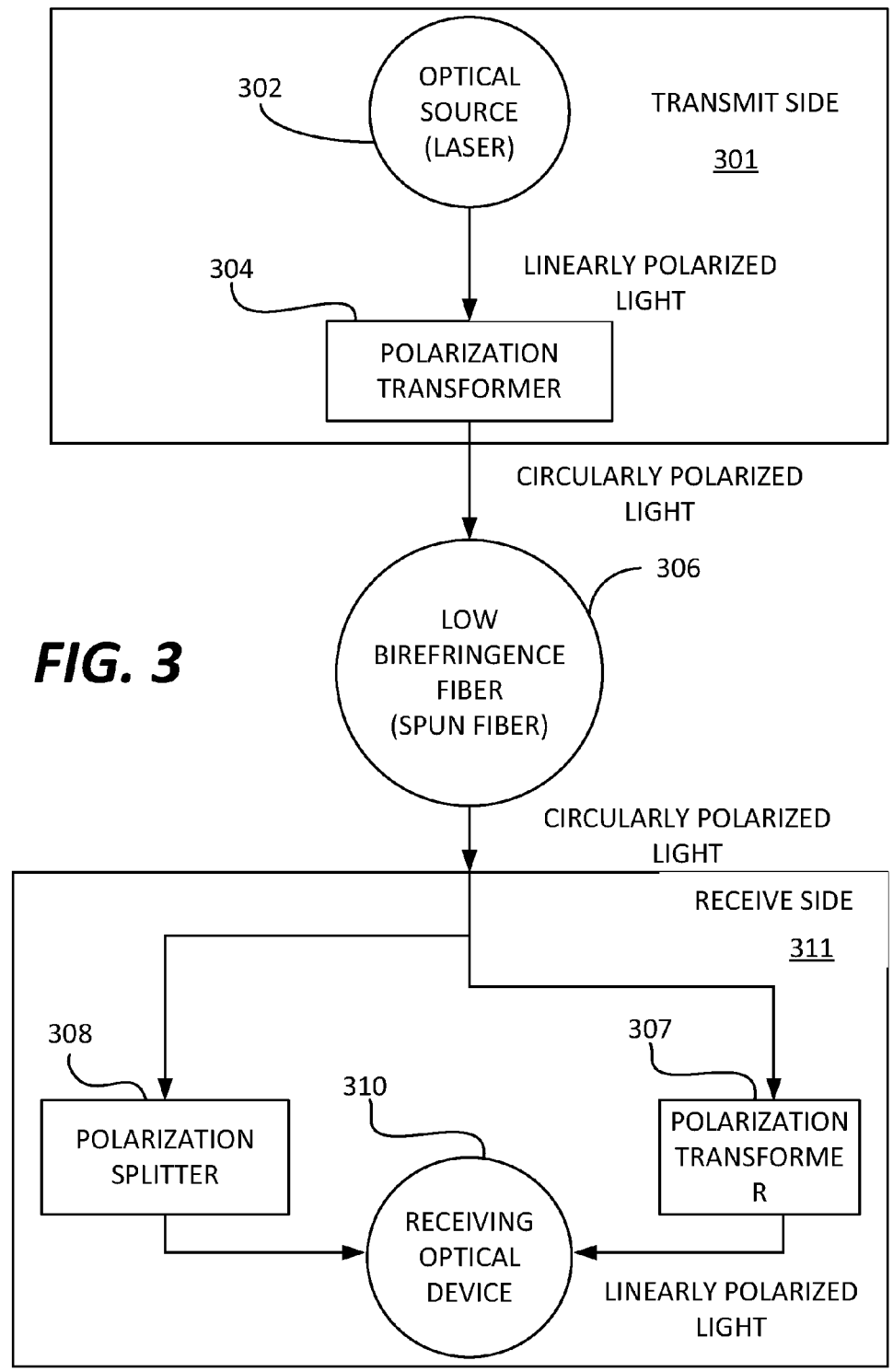
FIG. 3 is a system diagram illustrating a transmitter and receiver in accordance with embodiments of the invention.

FIG. 3 illustrates an example of a system including a transmit side 301 and a receive side 311 including aspects of various embodiments of the invention. For example, an optical source 302 can generate an optical signal (e.g., a laser with a linearly polarized light output). The optical source 302 can be coupled to polarization transformer 304 (e.g., a quarter-wave plate). The polarization transformer (e.g., quarter-wave plate) serves to transform the linearly polarized light to circularly polarized light. As illustrated, the polarization transformer 304 can then be coupled to the low birefringence fiber 306 (e.g., spun fiber), which maintains circular polarization, as discussed above. Using this arrangement, it will be appreciated that the connection of multiple optical fibers with an array of optical sources can be facilitated, because the transmission of data can be accomplished without regard to rotational alignment. Accordingly, this arrangement can greatly simplify assembly and implementation of systems with multiple optical fibers and an array of optical sources.

The low birefringence fiber 306, propagates the circularly-polarized light to the receiver side 311. In one embodiment of the receiver side 311, the spun fiber is coupled to a second polarization transformer 307 (e.g., quarter-wave plate). The second polarization transformer 307 can transform the circularly polarized light from the low birefringence fiber 306 into a linearly polarized light. Using this embodiment, there is no loss in optical power during the conversion.

In an alternative embodiment (illustrated as an alternative path) the receiver side 311 can include a polarization splitter 308 for dividing incoming circularly polarized light into two substantially identical components, each with linear polarization. The light output from the low birefringence fiber 306 is coupled to a polarization splitter 308. In this embodiment, instead of adding the second polarization transformer 307, the light from the spun fiber is split into two linearly polarized light paths of equal intensity using polarization splitter 308. One of which is illustrated and can be coupled to a receiving optical device 310, which can be used to receive and further process the optical signal transmitted from the transmit side 301.

In various embodiments, the optical fiber interconnect assemblies provided herein can be similar to conventional optical transmitters and receivers and can be implemented using many conventional technologies.

Figure 4:
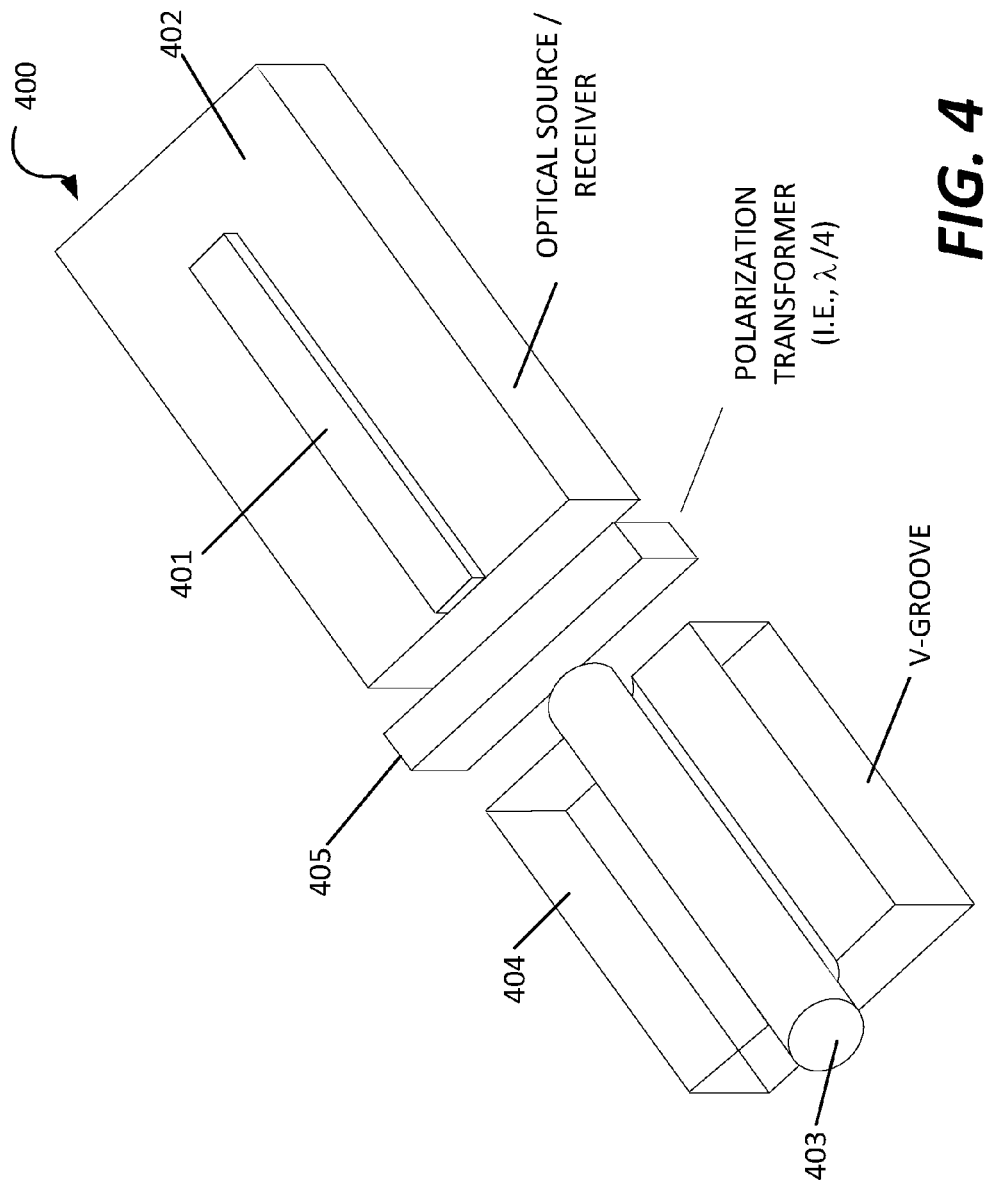
FIG. 4 illustrates an assembled view of a fiber optical package interconnect according to an embodiment of the invention.

FIG. 4 illustrates an example of embodiments of a fiber interconnect assembly which can be realized in either a transmitter or receiver configuration. An optical component 400 (which may be configured as a transmitter or a receiver) is coupled to a low birefringence fiber 403 via a polarization transformer 405. In one configuration, the optical component 400 may be an optical device 401 that is coupled to a substrate 402 and configured as an optical source, as illustrated. Additionally, in the illustrated arrangement, the low birefringence fiber 403 (e.g., spun fiber) can be mounted on V-groove 404 that is moveable. A lens can also be inserted between the low birefringence fiber 403 and optical component 400. The lens can be configured similar to lens 207 or can be in any configuration arranged between low birefringence fiber 403 and optical component 400. The polarization transformer 405 is used to transform between linearly polarized light on the optical component 400 side to circularly polarized light on the low birefringence fiber 403 side. For example, if the optical component 400 is configured as a source (e.g., laser), the linearly polarized light output to the polarization transformer 405 (e.g., a quarter-wave plate) is trans formed to circularly-polarized light is produced at the low birefringence fiber 403 input. In a receiver configuration, circularly-polarized light received from the low birefringence fiber 403 is transformed to linearly polarized light output to the optical component 400 (e.g., configured as an optical receiver). Accordingly, it will be appreciated that linearly polarized light form an optical transmitter can be transformed to circularly polarized light, propagated through the spun fiber back and transformed back to linearly polarized light at an optical receiver, using the optical fiber interconnect assemblies discussed and illustrated herein.

Figure 5:
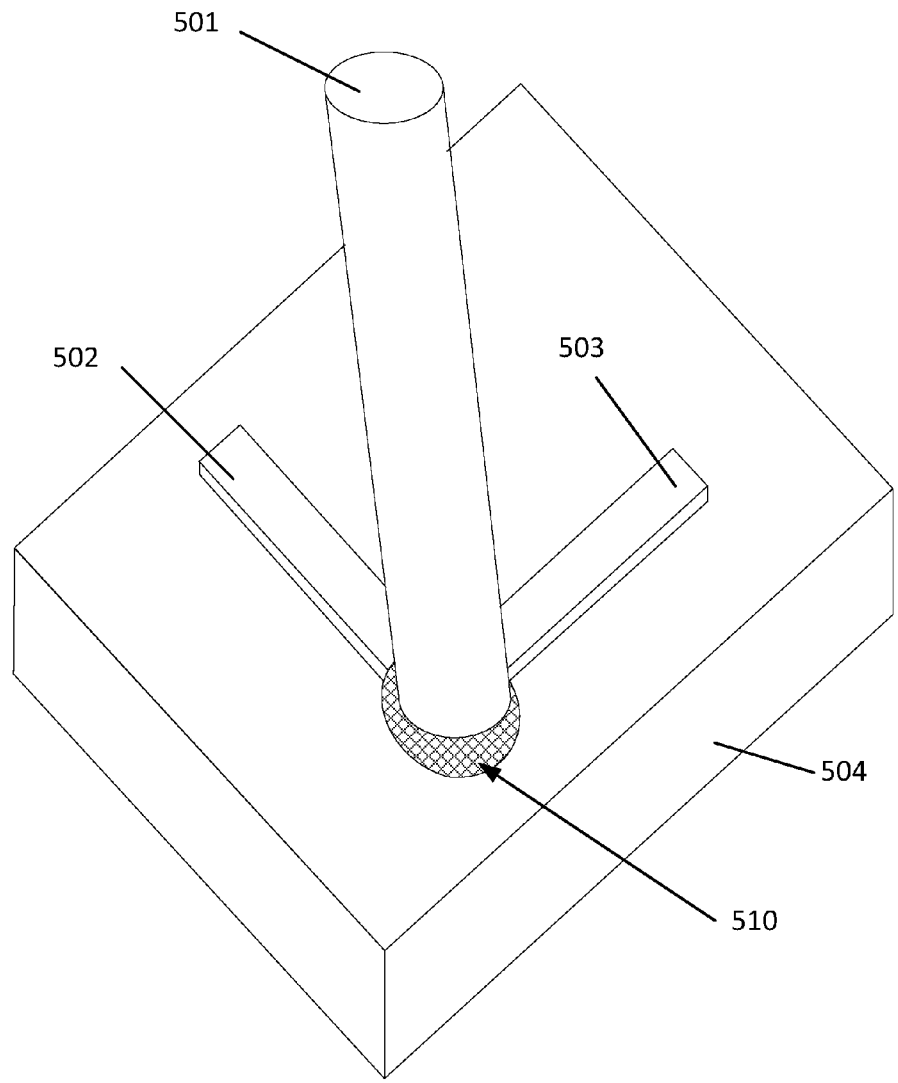
FIG. 5 illustrates an assembled view of a fiber optical package interconnect according to another embodiment of the invention.

FIG. 5 illustrates another embodiment of a receiver side assembly. The receiver side assembly can be fabricated on a substrate 504 and include a polarization splitter 510 for dividing incoming circularly polarized light in low birefringence fiber 501 into two substantially identical linearly polarized light signals that can be propagated via two separate optical paths, path 502 and path 503. These may then be used in subsequent circuits, such as optical receivers, waveguides, modulators, etc. Aspects of this embodiment were also discussed in relation to polarization splitter 308 of FIG. 3. As noted above, the circularly polarized light from the low birefringence fiber 501. (e.g., spun fiber) is coupled to a polarization splitter 510. In this embodiment, instead of adding the quarter-wave plate or similar polarization transformer, the light from the low birefringence fiber 501 is split into two linearly polarized lights of equal intensity that is propagated on two separate paths, path 502, and path 503. It will be appreciated that some systems require power splitting of the incoming laser light. Another embodiment of the invention can utilize an intrinsic 3 dB coupler at the input to the receiver side assembly.

A wave plate or retarder is an optical device that alters the polarization state of a light wave travelling through it (which was discussed above as an example of the polarization transformer 405). A wave plate works by shifting the phase between two perpendicular polarization components of the light wave. Conventionally, a wave plate can be a birefringent crystal with a carefully chosen orientation and thickness. The crystal is cut so that the extraordinary optic axis is parallel to the surfaces of the plate. Light polarized along this axis travels through the crystal at a different speed than light with the perpendicular polarization, creating a phase difference. When the extraordinary index is smaller than the ordinary index, the extraordinary axis is called the fast axis and the perpendicular direction in the plane of the surfaces is called the slow axis.

Depending on the thickness of the crystal, light with polarization components along both axes will emerge in a different polarization state. The wave plate is characterized by the amount of relative phase, Γ, that it imparts on the two components, which is related to the birefringence Δn and the thickness L of the crystal by the formula $$\Gamma = \frac{2\pi \Delta n L}{\lambda_0}$$

where $\lambda_0$ is the vacuum wavelength of the light. In an embodiment, a quarter-wave plate used as polarization transformer 405 creates a relative quarter-wavelength phase shift and can change linearly polarized light to circular and vice versa. This is done by adjusting the plane of the incident light so that it makes 45° angle with the fast axis.

Although the birefringence An may vary slightly due to dispersion, this is negligible compared to the variation in phase difference according to the wavelength of the light due to the fixed path difference ($\lambda_0$ a in the denominator in the above equation). Wave plates are thus manufactured to work for a particular range of wavelengths. In another embodiment, the phase variation can be minimized by stacking two wave plates that differ by a tiny amount in thickness back-to-back, with the slow axis of one along the fast axis of the other. With this configuration, the relative phase imparted can be, for the case of a quarter-wave plate, one-fourth a wavelength rather than three-fourths or one-fourth plus an integer. This is called a zero-order wave plate.

As described in the foregoing, in various embodiments, a quarter-wave plate can be used as a polarization transformer (e.g., polarization transformer 405) to convert linearly polarized light into circularly polarized light in the transmit side of a system, or conversely circularly polarized light into linearly polarized light on the receive side of the system.

In an alternative embodiment, the polarization transformer can be an in-fiber circular polarizer directly coupled to the source pigtail, which can be used as an alternative to a quarter-wave plate. The in-fiber circular polarizer can be, but is not limited to, an all-glass, in-fiber polarizer in a flexible stainless steel micro-tube that provides a circularly polarized output in a fiber format. The in-fiber circular polarizer can be tailored to meet spectral and performance specifications, including central wavelength, bandwidth and extinction ratio requirements. In yet another embodiment, the polarization transformer can be built into a source output waveguide structure. In still another embodiment the polarization splitter discussed herein can include a surface grating waveguide coupler. In other embodiments, the polarization transformer can be integrated into an optical source output waveguide structure In view of the foregoing, it will be appreciated that various arrangements and components can be used and the various embodiments of the invention are not limited to those illustrated, herein. Further, it will be appreciated that any equivalent means for performing the functionalities disclosed herein are contemplated in the various embodiments. Accordingly, embodiments can include any means for generating or receiving an optical signal, means for transforming the optical signal to a circularly-polarized light, and means for propagating the circularly-polarized light while maintaining the circular polarization.

Un-polarized fibers have residual optical birefringence, such that a linearly polarized light from an optical source is converted into an undefined and mechanically unstable polarization at the input to the subsequent device. Conventional polarization maintaining fibers (e.g., 101-103, as shown in FIG. 1), are manufactured with very strong inherent linear birefringence induced by mechanical stress. They confine linearly polarized light to a strongly guided mode.

However, these types of fibers pose a significant manufacturing problem. The birefringent axis of the fiber has to be precisely aligned to the linear polarization on both ends of the interconnect, for example at the laser output side and modulator input side. Thus, manufacturing now requires not only azimuthal alignment, but also angular fiber rotation with very precise tolerances.

The problem is further complicated if several fiber interconnects are required between packages, especially with metalized fiber for hermetic feed through seals.

Angular orientation alignment of several independent linear polarization maintaining fibers is an expensive and time consuming process.

In contrast, as discussed above, low birefringence optical fiber, also known as spun fiber, can transmit polarized light over large distances with minimum error. Unlike conventional fibers, spun fibers can relay both linear and circular polarization without axial alignment of the fiber when splicing or connecting the spun fiber. Spun fiber structure is designed to spread non-uniformities in silica along all possible directions, effectively cancelling out total fiber birefringence. The spun fiber can be fabricated from liquid silicate. By rotating glass during the fiber drawing process, such that the spatial period of rotation over the fiber length is much smaller than the beat length, it produces a waveguide with unique properties, where all fiber non-uniformities are averaged along all possible directions that effectively eliminate total fiber birefringence. With total birefringence close to zero, the spun fiber can hold circular polarization even when bent or twisted. Unlike conventional polarization maintaining fibers that can hold only linearly polarized light, or require special handling, spun fiber preserves both linear and circular polarization. This type of fiber is commercially available (e.g., http://www.ivgfiber.com/fibers.htm).

The various embodiments described herein provide for packaging of interconnects between modules that require polarization control. Spun fiber is manufactured from intrinsically high-stress fiber, such as elliptical-clad fiber 102 from FIG. 1, but with a following rapid rotation or spinning. As the spatial period of spinning is significantly smaller than the beat length, the state of polarization variation in the fiber cannot keep up with the pace of spinning. As a result, the state of polarization remains effectively unchanged over the propagation distance and, the spun fiber is able to transmit a consistent polarization state from input to output. For example, either linear or circular polarization is preserved from fiber input to output. Unfortunately, the linear polarization state is still angularly rotated at the output and poses a problem for packaging applications. This residual rotation is due to the ratio of the spinning period over the bit period being not completely negligible. However, both left and right circular state of polarization is angularly invariant. As discussed above in the relation to the various embodiments of the invention, circular polarization can be achieved using a polarization transformer (e.g., wave plate) to avoid the residual rotation problem when propagating optical signals in the linear polarization state.

Those of skill in the art will appreciate that information and signals can be represented using any of a variety of different technologies and techniques. For example, data, instructions, commands, information, signals, bits, symbols, and chips that may be referenced throughout the above description can be represented by voltages, currents, electromagnetic waves, magnetic fields or particles, optical fields or particles, or any combination thereof.

While this disclosure shows exemplary embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order.

Furthermore, although elements of the invention may be described or claimed in the singular, the plural is contemplated unless limitation to the singular is explicitly stated.

What is claimed is:

1. An optical assembly comprising:
   a laser configured to generate light;
   a low-birefringence optical fiber, wherein the low-birefringence optical fiber has high intrinsic birefringence and a high spin structure resulting in low effective birefringence; and
   a polarization transformer directly coupled to the laser between the laser and the low-birefringence optical fiber, wherein the polarization transformer is configured to transform a substantially linearly-polarized light from the laser to a substantially circularly polarized light.

2. The optical assembly of claim 1, wherein the low-birefringence optical fiber is a spun fiber.

3. The optical assembly of claim 1, wherein the low-birefringence optical fiber preserves a state of polarization of an inputted circularly-polarized light.

4. The optical assembly of claim 1, wherein the polarization transformer is a quarter-wave plate.

5. The optical assembly of claim 1, wherein the polarization transformer is an in-fiber circular polarizer.

6. The optical assembly of claim 1, wherein the polarization transformer is integrated into an optical source output waveguide structure.

7. The optical assembly of claim 1, wherein the low-birefringence optical fiber is mounted in receptacle.

8. The optical assembly of claim 7, wherein the receptacle is movable and includes a V-groove.

9. The optical assembly of claim 1, further comprising a lens coupled between the laser and the low-birefringence optical fiber.

10. The optical assembly of claim 1, wherein the polarization transformer is a polarization splitter.

11. The optical assembly of claim 10, wherein the polarization splitter is a surface grating waveguide coupler.

12. An apparatus comprising:
   means for generating an optical signal;
   means for transforming the optical signal to a circularly-polarized light, the transforming means being directly coupled to the generating means; and
   a low-birefringence optical fiber configured to propagate the circularly-polarized light while maintaining the circularly-polarized light, wherein the low-birefringence optical fiber has high intrinsic birefringence and a high spin structure resulting in low effective birefringence.

13. The apparatus of claim 12, wherein the low-birefringence optical fiber preserves a state of polarization of inputted circularly-polarized light and does not preserve a state of polarization of inputted linearly polarized light.

14. The optical assembly of claim 1, wherein the low-birefringence optical fiber preserves a state of polarization of inputted circularly-polarized light and does not preserve a state of polarization of inputted linearly polarized light.

* * * * *